United States Patent
Farver et al.

(10) Patent No.: US 8,661,154 B2
(45) Date of Patent: Feb. 25, 2014

(54) MANAGING OBJECTS USING A CLIENT-SERVER BRIDGE

(75) Inventors: Jennifer M. Farver, Chicago, IL (US);
Joshua Goldshlag, Arlington, MA (US);
David Parmenter, Newton, MA (US);
Ian Schechter, Sharon, MA (US); Tim Wakeling, Andover, MA (US)

(73) Assignee: Ab Initio Technology LLC, Lexington, MA (US)

( * ) Notice: Subject to any disclaimer, the term of this patent is extended or adjusted under 35 U.S.C. 154(b) by 52 days.

(21) Appl. No.: 12/967,533

(22) Filed: Dec. 14, 2010

(65) Prior Publication Data
US 2011/0153711 A1    Jun. 23, 2011

Related U.S. Application Data

(60) Provisional application No. 61/268,293, filed on Dec. 14, 2009.

(51) Int. Cl.
*G06F 15/16* (2006.01)

(52) U.S. Cl.
USPC ...... 709/234; 709/201; 709/203; 707/999.01; 707/E17.107

(58) Field of Classification Search
None
See application file for complete search history.

(56) References Cited

U.S. PATENT DOCUMENTS

| | | | |
|---|---|---|---|
| 5,966,072 | A | 10/1999 | Stanfill et al. |
| 7,164,422 | B1 | 1/2007 | Wholey, III et al. |
| 7,167,580 | B2 | 1/2007 | Klein et al. |
| 2004/0205208 | A1 * | 10/2004 | Koponen et al. .............. 709/230 |
| 2005/0027860 | A1 | 2/2005 | Benson et al. |
| 2005/0114369 | A1 | 5/2005 | Gould et al. |
| 2006/0095466 | A1 | 5/2006 | Stevens et al. |
| 2007/0271381 | A1 | 11/2007 | Wholey et al. |
| 2008/0049022 | A1 | 2/2008 | Sherb et al. |
| 2008/0229334 | A1 | 9/2008 | Graham et al. |
| 2008/0256014 | A1 | 10/2008 | Gould et al. |
| 2009/0083313 | A1 | 3/2009 | Stanfill et al. |
| 2009/0119302 | A1 * | 5/2009 | Palmer et al. ................. 707/10 |
| 2009/0187654 | A1 | 7/2009 | Raja et al. |
| 2010/0169392 | A1 * | 7/2010 | Lev Ran et al. ............... 707/827 |
| 2010/0241694 | A1 * | 9/2010 | Jensen et al. ................. 709/203 |

OTHER PUBLICATIONS

International Search Report & Written Opinion, Patent Cooperation Treaty, application No. PCT/US2010/060270, mailed Apr. 29, 2011, 15 pages.

Gedik, Bugraet al., "Tools and strategies for debugging distributed stream processing applications." Software Practice and Experience, Oct. 2, 2009, 39, pp. 1347-1376.

Notification Concerning Transmittal of International Preliminary Report on Patentability, International Application No. PCT/US2010/060270 mailed on Jun. 28, 2012.

* cited by examiner

*Primary Examiner* — Wen-Tai Lin
(74) *Attorney, Agent, or Firm* — Fish & Richardson P.C.

(57) ABSTRACT

A method for supporting communication between a client and a server includes receiving a first message from a client. The method also includes creating an object in response to the first message. The method also includes sending a response to the first message to the client. The method also includes receiving changes to the object from a server. The method also includes storing the changes to the object. The method also includes receiving a second message from the client. The method also includes sending the stored changes to the client with a response to the second message.

20 Claims, 10 Drawing Sheets

MANAGING OBJECTS USING A CLIENT-SERVER BRIDGE

CROSS-REFERENCE TO RELATED APPLICATIONS

This application claims priority to U.S. Application Ser. No. 61/286,293, filed on Dec. 14, 2009, incorporated herein by reference.

BACKGROUND

This description relates to managing objects using a client-server bridge.

Some client-server systems adopt one of two methods of operation. Some systems have a "thin" client, which presents an interface that provides a veneer to the user with very little ability to perform operations independent of the server (for example, an HTML web page). Some systems have a "fat" client that provides an interface capable of performing complex operations, utilizing the resources of the client hardware (for example, a user-interface based on the Microsoft foundation classes). Some "fat" clients are written in the same or similar programming languages as the server application and therefore the client could be tightly coupled to the backend server (for example, Java RMI or Microsoft's COM+ technologies).

SUMMARY

In one aspect, in general, a method for supporting communication between a client and a server includes receiving a first message from a client. The method also includes creating an object in response to the first message. The method also includes sending a response to the first message to the client. The method also includes receiving changes to the object from a server. The method also includes storing the changes to the object. The method also includes receiving a second message from the client. The method also includes sending the stored changes to the client with a response to the second message.

Aspects can include one or more of the following features.

Storing the changes may include creating a log of changes and sending the stored changes to the client may include sending the log of changes. Storing the changes may include updating a current state of the object and sending the stored changes to the client may include sending the current state of the object. Receiving the first message from the client may include receiving a temporary identifier for a client object; creating the object includes obtaining a permanent identifier for the object; and sending the response to the first message includes sending a mapping between the temporary identifier and the permanent identifier. Obtaining a permanent identifier may include sending a server message to the server. Sending the server message may include interleaving the server message with other server messages.

Methods may also include registering interest in the object with the server. Receiving changes to the object may include receiving changes to the object associated with events generated by the server. Receiving the first message may include utilizing a first protocol, and receiving the changes includes utilizing a second protocol different from the first protocol. Methods may also include storing changes for multiple objects for multiple clients.

The object can correspond to a portion of a dataflow graph that includes multiple nodes representing components of the dataflow graph and links between the nodes representing flows of data between the components. Receiving the first message from the client can include receiving a value of a parameter for defining at least one characteristic of a component of the dataflow graph. The method can include providing an interface that receives one or more parameters for defining respective characteristics of components of the dataflow graph. The interface can display multiple user interface elements with relationships among the user interface elements being based on dependencies between components of the dataflow graph. The relationships can be defined by a specification stored on the server.

Receiving the first message can include receiving a request for intermediate data; and creating the object can include: compiling the portion of the dataflow graph, and producing output to an output dataset by executing the compiled portion of the dataflow graph. Creating the object can further include: determining a first set of components required to generate the intermediate data; disabling components in the dataflow graph that are not in the first set of components; and creating an intermediate data sink coupled to the dataflow graph to store the output dataset. Determining the first set of components can include identifying links that do not connect a data source to the intermediate data sink. Creating an intermediate data sink can include: determining that a link to the intermediate data sink represents a parallel data flow; and creating a parallel data sink as the intermediate data sink.

In another aspect, in general, a computer-readable medium stores a computer program for supporting communication between a client and a server. The computer program includes instructions for causing a computer to: receive a first message from a client; create an object in response to the first message; send a response to the first message to the client; receive changes to the object from a server; store the changes to the object; receive a second message from the client; and send the stored changes to the client with a response to the second message.

In another aspect, in general, a system for supporting communication between a client and a server includes: a server including at least one processor; and a bridge including at least one processor configured to manage objects in the system. The managing includes: receiving a first message from a client, creating an object in response to the first message, sending a response to the first message to the client, receiving changes to the object from the server, storing the changes to the object, receiving a second message from the client, and sending the stored changes to the client with a response to the second message.

In another aspect, in general, a system for supporting communication between a client and a server includes: means for serving data; and means for managing objects in the system. The managing includes: receiving a first message from a client, creating an object in response to the first message, sending a response to the first message to the client, receiving changes to the object from the means for serving data, storing the changes to the object, receiving a second message from the client, and sending the stored changes to the client with a response to the second message.

Aspects can include one or more of the following advantages. Communication between a client and a server may be simplified. A server developed for a robust client may be adapted to support scripting clients. Changes to objects may be tracked and clients may be updated without necessarily maintaining a continual connection between the bridge and the client.

Other features and advantages of the invention will become apparent from the following description, and from the claims.

DESCRIPTION

Figure 1:
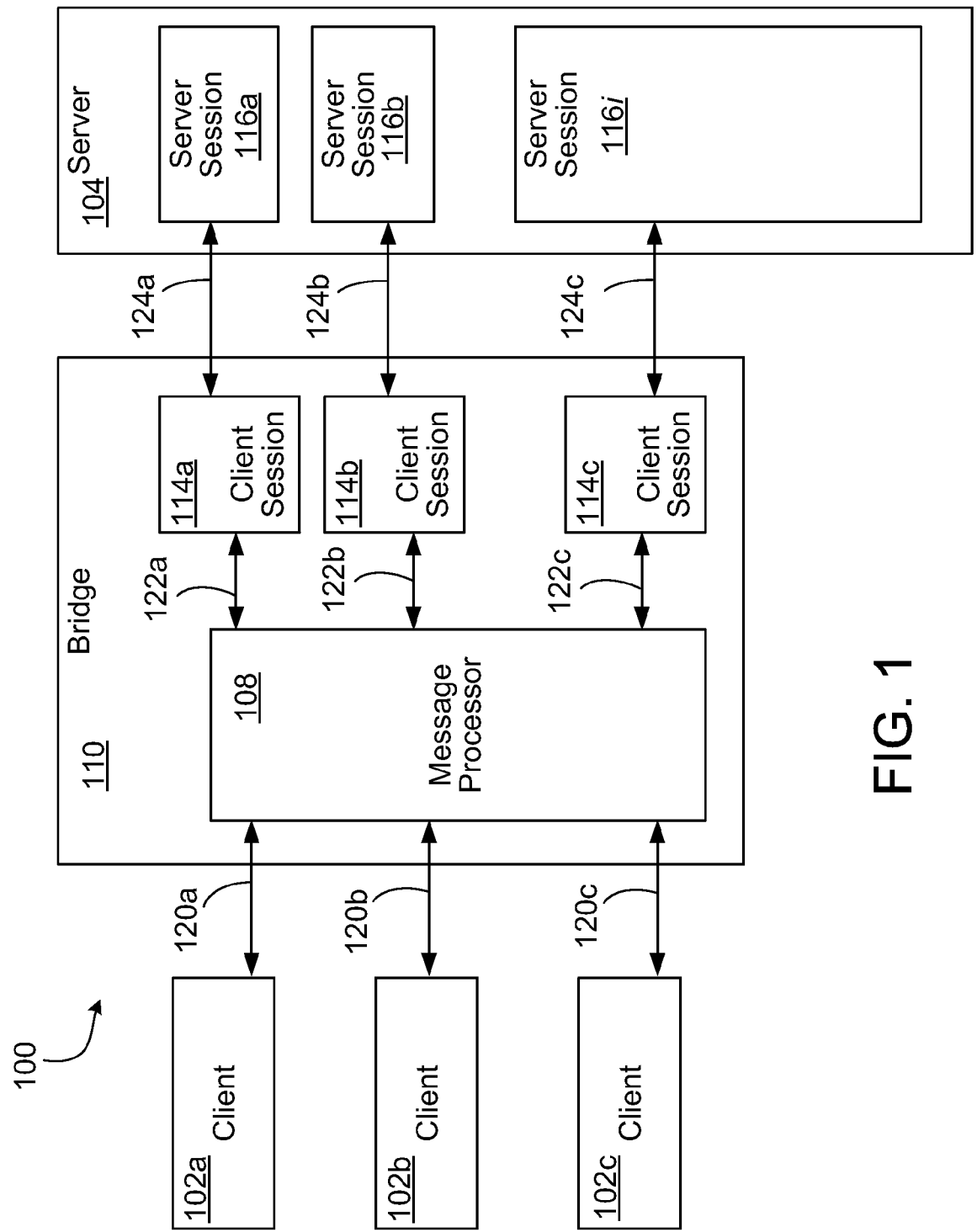
FIG. 1 is a schematic diagram of a bridged client server system.

Some tools enable more functionality on client systems utilizing a browser than would otherwise be available on typical thin clients. Some of these tools are constructed in programming languages which differ from those used to create the server applications. In order to facilitate communication between a client and a server built using different technologies a "bridge" communications layer is established between a client system and a server system, as shown in FIG. 1. Clients 102a, 102b, 102c are each in communication with a corresponding server session 116a, 116b, 116c running in a server 104, via a bridge 110. Messages from the clients 102a, 102b, 102c to the bridge 110 are sent to a message processor 108 that translates the stateless protocol of the clients 102a, 102b, 102c, for example the hypertext transport protocol (HTTP), into the collection of protocols provided by the server 104. In some arrangements, code generation may be used to automate the conversion. In some arrangements, each of the clients, the bridge 110, and the server 104 are running on a separate processor or computer system and are in communication over a network. The clients 102a, 102b, 102c may be thin clients that rely on the bridge 110 for communication with the server 104, and there may be other fat clients (not shown) that are able to communicate directly with the server 104.

Generally, a single client 102a connects to a single client session 114a via the bridge 112. The bridge may interact with multiple clients simultaneously. The single client session 114a in turn connects to a single server session 116a. The message processor 108 creates response objects to package the information that is exchanged, including the response from the server to a message from a client and sends the response object to the appropriate client 102a, 102b, 102c. However, in some instances other configurations may be used. For example, communication with the bridge 110 or with the server 104 may be load balanced through a load balancer to improve performance.

Represented by arrows 120a 120b 120c, communication between the clients 102a, 102b, 102c and the bridge 110 may include a request and response. The client 120a, 102b, 102c may make a request to the bridge 110 and wait for a response. The bridge 110 may either create a client session 114a, 114b, 114c for the client 102a, 102b, 102c or, if one already exists, use the existing session. The bridge 110 translates the incoming message into a protocol understood by the server 104. Various types of messages that can be transmitted in message streams 124a, 124b, 124c between the bridge 110 and the server 104, including Remote Procedure Calls (RPCs), data (e.g., "byte streams" and "object streams"), and events (e.g., unidirectional messages).

In general, RPCs operate by sending a request and receiving a response. This basic pattern has three variations: "standalone" RPCs characterized by a process thread waiting or polling for a response without implicit completion or failure notification; "synchronous" RPCs characterized by a process thread blocking until a response indicating success or failure is received; and "asynchronous" RPCs characterized by registering a callback which will be triggered when the procedure completes. In some examples, RPCs made by a particular thread are guaranteed to be executed in the order they are invoked.

Communication between the bridge 110 and the server 104 enables message streams that include RPCs to be interleaved. Multiple different RPC messaging streams may be handled simultaneously causing the messages to arrive at the bridge overlapping with each other. The bridge 110 accepts and processes each message independently. The bridge 110 also permits cancellation or abort message to be sent. When receiving the abort message the bridge 110 terminates a currently running procedure, or notifies the server 104 to terminate a currently running procedure.

The bridge 110 and the server 104 may communicate using data streams. Data streams are logical byte streams that employ a windowing protocol to restrict the amount of data that may be transmitted at once. A data stream may be passed between bridge 110 and server 104 as part of an RPC request or response message, a plain message, or a progress message. Once a data stream is passed to the bridge or server, the data stream is established by a handshake procedure that identifies the stream for the side of the connection that has received the stream object as well as flow-control parameters. The amount of data transmitted over a steam may be limited based on constraints set up by the server 104 or the bridge 110.

Figure 2:
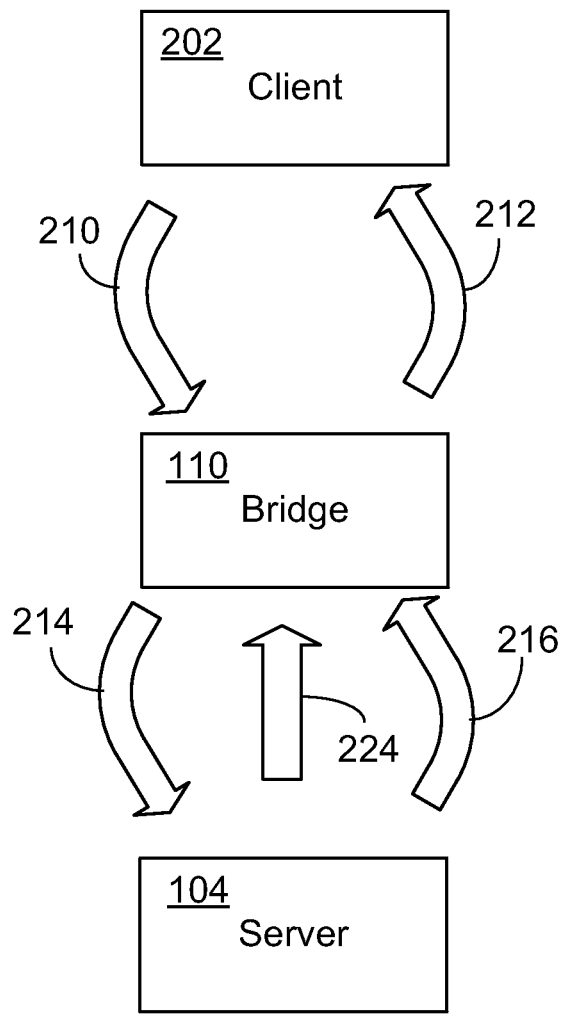
FIG. 2 is a schematic diagram of exemplary communication patterns among a client, bridge, and server.

Referring to FIG. 2, in some arrangements a client 202 may maintain a representation of processes and information which may be executed and stored on a server 104. The client 202 may be made aware of changes which occur in the processes and information on the server 104. Represented by arrows 210, 212 the client 202 may communicate with a bridge 110. In some arrangements, this communication may result from programmatic interactions with the representations of data stored on the client 202. The bridge 110, receives the request and, represented by process arrows 214, 216 may communicate with the server 104. As discussed above, the communications between the bridge 110 and the server 104 may utilize a set of more robust protocols than the communications between the client 202 and the bridge 104. Represented by arrow 224, the server 104 may notify the bridge 110 of changes to an underlying object when a message is not currently being processed. For example, the bridge 110 may register an interest in a given object and the server 104 may notify the bridge 110 when the object is altered or accessed. In some arrangements, the stateless nature of communications between the client 202 and the bridge 110 prevent the bridge 110 from communicating the changes immediately to the client 202. In these circumstances, information may be stored on the bridge 110 and delivered to the client 202 as part of the response to a subsequent request. In other arrangements, a data stream may be established between a client and a server to allow for continual updating.

In some arrangements, the client 202 may create a representation of information that does not exist on the server 104, for example, creating a new customer object. This newly created information may be provided with a temporary identifier. The client 202 may subsequently perform several actions with the new information. In some arrangements, the client 202 may perform operations which utilize both the new information and existing information accessed from the server, sometimes updating existing information using the temporary identifier. The client 202 may perform numerous operations using the information prior to notifying the server 104. Eventually, the client 202 may send one or more requests to the bridge 110 requesting the operations be executed on the server 104. The bridge 110 identifies the new information which does not exist on the server 104. As a result the bridge may create records representing the information on the server and obtain a permanent identifier. The bridge 110 then reconciles the temporary identifier provided on the messages with the permanent identifier. As part of the response, the bridge 110 provides the client 202 a mapping of the temporary identifier to the permanent identifier.

On the bridge 110, a message service managed by the message processor 108 receives an incoming message. In some arrangements, the message may specify a plurality of operations which may be performed using a plurality of objects. Some of the objects may already exist while other objects may be new. Generally all objects will be identified using an identifier. Existing objects will be identified using a permanent identifier, while newly created objects will be identified using a temporary identifier. The message service identifies which operations need to be performed.

An object service on the bridge 110 identifies which of the objects already exist on the server 104 and retrieves them. For the new information, data is added to the server 104 and a permanent identifier is assigned, the object service provides the mapping between the permanent identifier and the temporary identifier.

Figure 3:
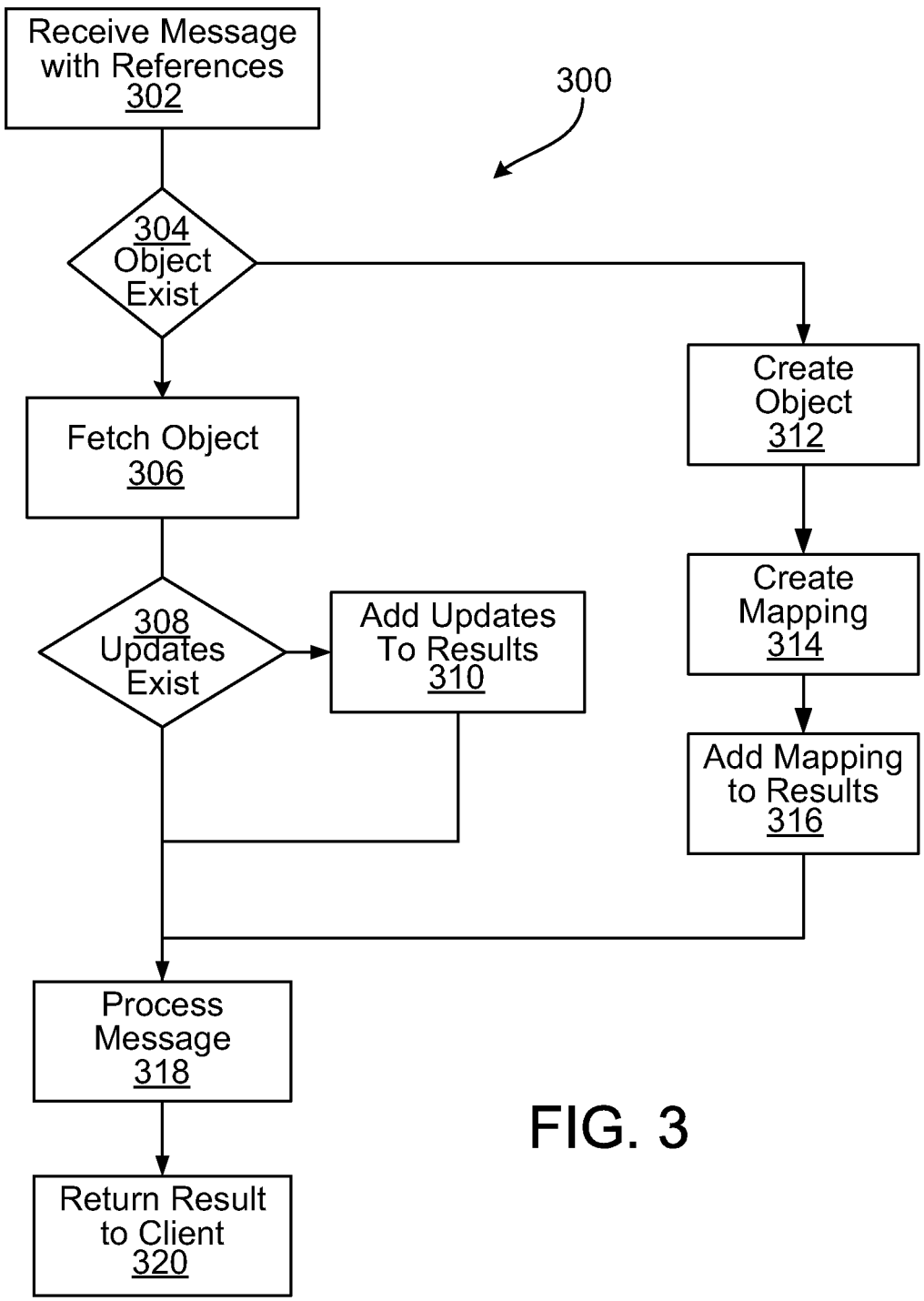
FIGS. 3-5 are flowcharts of exemplary operations performed by the system.

Referring to FIG. 3, a flowchart 300 represents an exemplary arrangement of operations performed by the bridge 110. Typically the operations are executed by one or more processors of a computer system upon which the bridge is resident. While typically executed by a single electronic device, in some arrangements operation execution may be distributed among two or more electronic devices (for example, computer systems).

Operations include receiving a message with references 302. The reference may be a pointer to an object stored in memory, or the reference may be to an identifier which locates an object, for example. The message may reference multiple objects. The references may be provided in a separate list or they may be nested inside the message.

Operations also include checking to determine whether an object exists 304. In some cases, the bridge may send a message to the server asking if the object exists. In other cases, operation 304 may be combined with other operations. For example, the bridge may perform an operation to attempt to fetch the object from the server 306. Specific identifiers may be used to identify new objects, for example, a specific range of keys, a specific key prefix, or another field on the message may indicate that the object is new. The bridge may perform this operation multiple times, once for each object referenced by the message.

Operations also include fetching the object 306. In some cases, the bridge may fetch the object identified in the message from the server. In other cases, the bridge may cache a local copy of the object in the local storage. Before sending a message to the server, the bridge may check its local storage for the object and if found return a response directly to the client. As discussed above, the local copy of the object may be kept in sync with the copy on the server via back channel communications. In some implementations, the bridge may interact with several servers and may use a routing table to determine on which server the object is located.

Operations also include checking to determine whether any updates are pending 308. In some arrangements, the bridge may cache changes made to local copies of objects. These changes may be stored in a specific memory location, a table, or other storage device. The changes may be identified based on an object type and the primary key, or the object may be identified based on a globally unique identifier.

Operations also include adding updates to the results 310. Once the bridge identifies that updates are pending for an object, the bridge may compile a list of those updates and attach them to a response message to be delivered to the client.

Operations also include creating an object 312. In some cases, if the object does not exist then the bridge creates a new object. This is generally accomplished by sending a message to the server. The newly created object will generally include a new identifier, different from the identifier used by the client.

Operations also include creating a mapping 314. For example, the bridge creates a mapping pairing the client identifier with the permanent identifier provided when creating the object. Once the client becomes aware of the mapping the client no longer uses its original identifier and instead can adopt the permanent identifier for all subsequent communication.

Operations also include adding the mapping to results 316. In some arrangements, in order to communicate the mapping to the client, the bridge adds the mapping onto the response message.

Operations also include processing the message 318. Once the bridge has identified, fetched, and created all necessary objects, the bridge performs the operation requested. In some implementations, this operation may include sending one or more messages to the server. In some implementations, the messages supported by the bridge are identical to messages supported by the server. In which case, the necessary programming to support the translation of messages between the client and the server may be automatically generated.

Operations also include sending the results to the client 320. For example, once the message is processed the results of that message are combined with any updates and mappings and are returned to the client.

Figure 4:
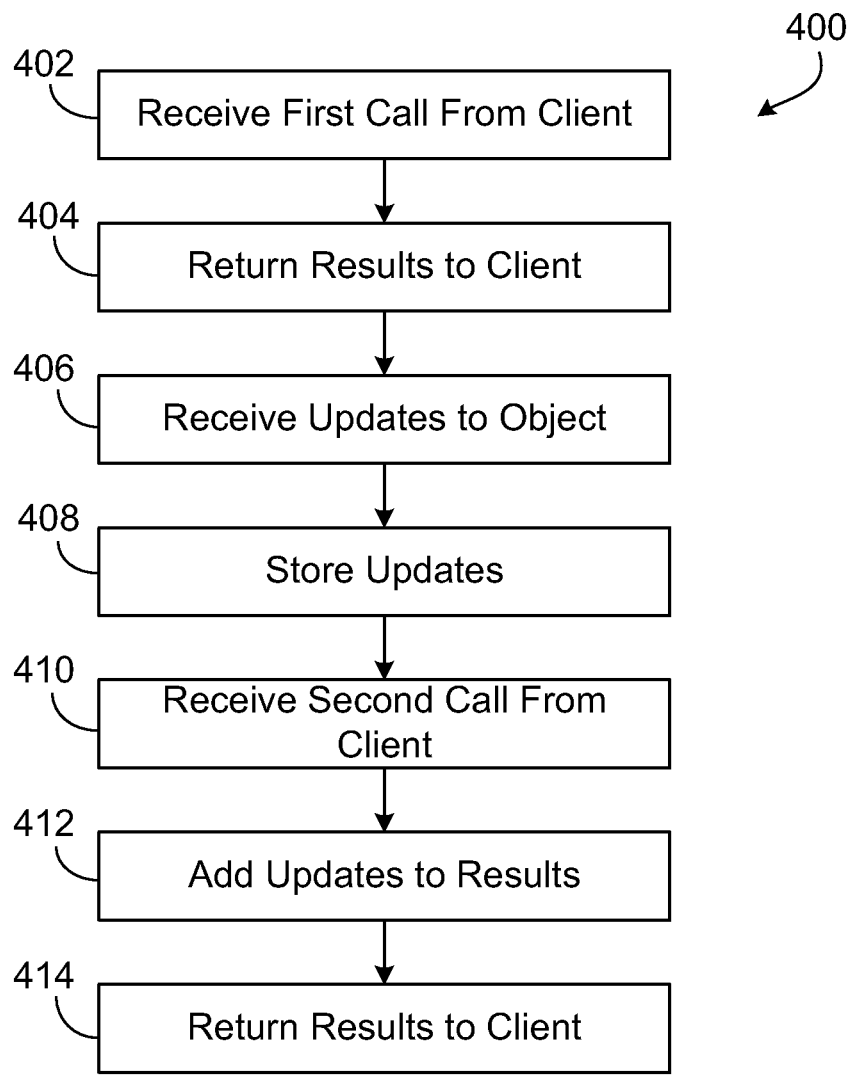

Referring to FIG. 4, a flowchart 400 represents another exemplary arrangement of operations performed by the bridge 110. Typically the operations are executed by one or more processors of a computer system upon which the bridge is resident. While typically executed by a single electronic device, in some arrangements operation execution may be distributed among two or more electronic devices (for example, computer systems).

Operations include receiving a first request from client 402. A request received from the client may result in the creation or access of one or more objects from the server. These objects may be cached on the bridge in order to improve performance of later access.

Operations also include sending results to the client 404. In some cases, the response to a request is sent to the client. Objects created or accessed during processing the request may be retained on the bridge in a local data store, for example a memory or a database. In some arrangements, one common copy of the object may be stored for all clients who wish to access the object. In other arrangements, the objects may be stored along with a client identifier so that each client has an individual copy stored on the bridge. In other arrangements, a common copy is stored on the bridge, unless the client modifies the object, in which case an individual version of the objects with the changes is maintained for the client.

Operations also include receiving updates to the object 406. For example, the bridge may receive updates of the object from the server. Updates may be sent from the server through a data stream or event based communication.

Operations also include storing updates 408. In some arrangements, the updates received for the object may be stored in a specific location. In some arrangements, changes may be stored as an audit trail that list the fields and values which were changed as well as the time the change occurred. In other arrangements, the changes may be tracked based on when the bridge was notified of the changes. In still other arrangements, an entire object may be updated even if only a single value is changed. Operations may also include receiving any number of additional requests from the client that are also handled by the bridge. Updates to objects can be included when providing results of those requests back to the client. This example includes receiving a second request from the client 410, and adding updates to the results 412. The bridge may add the changes received from the server to the objects stored on the server onto the response message being sent to the client. In some cases, the bridge may also add any changes that have occurred to the objects as result of processing client's message. Operations also include sending the results to the client 414.

Figure 5:
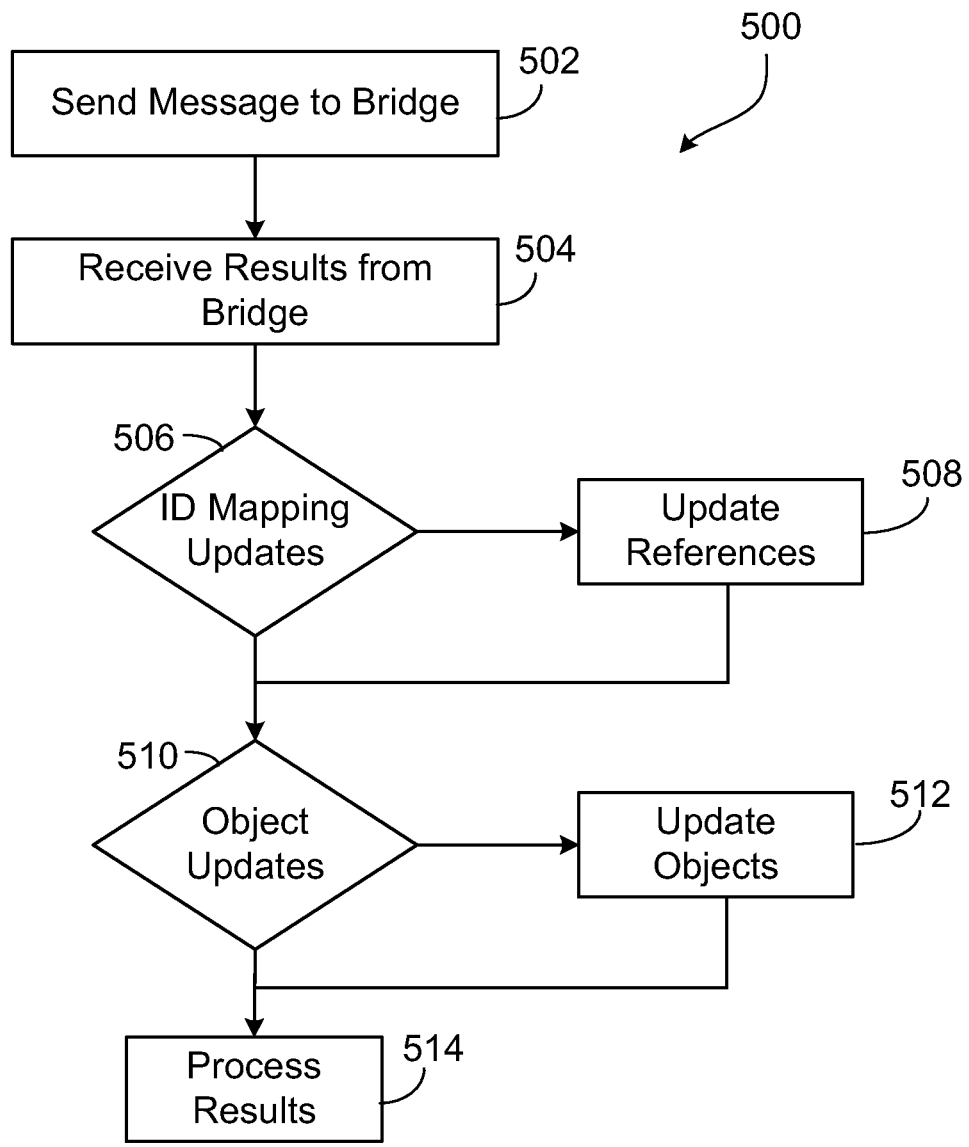

Referring to FIG. 5, a flowchart 500 represents an exemplary arrangement of operations performed by a client (FIG. 1, 102a, 102b, 102c) interacting with a bridge 110. Typically, the operations are executed by one or more processors of a computer system upon which the client is resident. While typically executed by a single electronic device, in some arrangements operation execution may be distributed among two or more electronic devices (for example, computer systems).

Operations include sending a message to the bridge 502. For example, the client may send a message to the bridge requesting that an action be performed related to an object stored on the server.

Operations also include receiving a response from the bridge 504. For example, the client receives a response from the bridge including results of performing the requested action.

Operations also include checking for mappings 506. In some cases, when the client receives a response from the bridge, the client checks if there are any updated mappings attached to the message.

If there are updated mappings, the operations include updating references 508. For example, the client updates the new objects that it had created with temporary identifiers, substituting the permanent identifier assigned by the server for the temporary identifier assigned at the object creation.

Operations also include checking for object updates 510. For example, the client checks the response to see if any existing objects have been updated at the server. If so, the operations include updating the objects 512 at the client. For example, the client may apply the changes included in the message to any local copies of objects that are currently stored at the client.

Operations also include processing the results 514. For example, the response message from the server may convey information to the client that enables the client to take a predetermined action based on the results. The response message may indicate whether the requested operation was successful or whether the operation failed. The response message may also include objects and other information associated with a request. For example, a request to access a specific customer object may result in the customer object being returned in the response.

One example of a system utilizing a bridge is a system for generating a user interface to allow a non-technical user to configure parameterized dataflow graphs. A dataflow graph is a computer program executed within a dataflow graph execution environment that processes data from one or more data sources. The data from the data sources are manipulated and processed according to the dataflow graph and exported to one or more data sinks Data sources and sinks can include files, databases, data streams, or queues, for example. Dataflow graphs are represented as directed graphs including nodes representing data processing components each including code for processing data from at least one data input and providing data to at least one data output, and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. The data structures and program code used to implement dataflow graphs can support multiple different configurations by being parameterized to enable different sources and sinks to be substituted readily, for example. Furthermore, in some arrangements, the flow of the dataflow graph may be altered by the use of parameters, such that a component or a series of components may be bypassed.

The execution environment may be hosted on one or more general-purpose computers under the control of a suitable operating system, such as the UNIX operating system. For example, the execution environment can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof.

The construction of a dataflow graph can be highly technical in nature in some cases. While written to achieve specific business ends, the underlying structure and construction of the graph is determined based upon technical considerations. For example, graph components may be selected to maximize reusability, or to support parallel processing. On the other hand, how and where a graph is used may be largely a business decision. Some of the parameters associated with a parameterized dataflow graph can be used to enable business users to customize dataflow graphs without requiring the user to understand the technical complexities behind its implementation. The parameterized dataflow graphs simplify customization and facilitate reuse.

An interface for identification of parameter values for constructing a dataflow graph can be presented on a client machine. In some implementations, the client may be accessing a development environment running on a server using a web browser on the client that provides the parameter interface, and using a scripting language which provides some capability for client side processing. The scripting language may communicate with the server to update parameters and perform other necessary operations. This communication may occur via a bridge machine which translates the communications between the client and the server running a development environment storing objects and associated parameter values for the graphs being constructed.

Figure 6A:
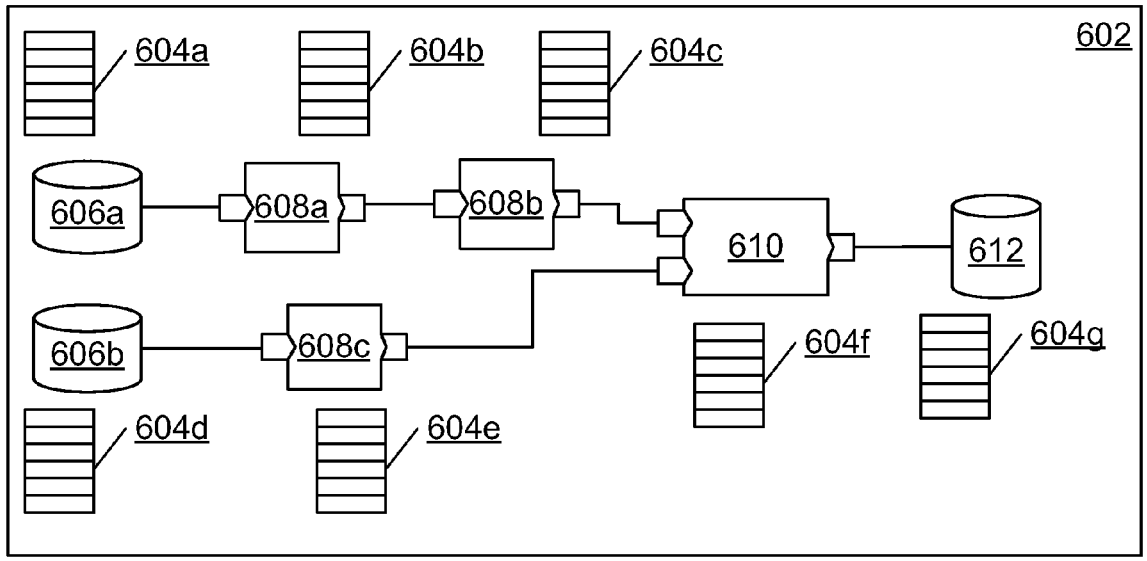
FIG. 6A is a diagram of an exemplary dataflow graph.

For example, referring to FIG. 6A a dataflow graph 602 may include data sources 606a, 606b, components 608a-c, 610 and data sinks 612. Each of the sources, components, and sinks may be associated with a set of parameters 604a-g. A parameter for one source, component, or sink may be used to evaluate a parameter for a different source, component, or sink. The sources 606a, 606b are connected to the input ports of components 608a, 608c. The output port of component 608a is connected to the input port of component 608b. The output port of component 610 is connected to data sink 612. The connections between the sources, components, and sinks define the data flow.

Some of the data sources, components, or sinks may have input parameters 604a-g which may define some of the behavior of the graph. For example, a parameter may define the location of the data source or sink on a physical disk. A parameter may also define the behavior of a component, for example, a parameter may define how a sorting component sorts the input (for example, sort by zip code). In some arrangements, the value of one parameter may depend upon the value of another parameter. For example, a source 606a may be stored in a file in a particular directory. The parameter set 604a may include a parameter called "DIRECTORY" and another called "FILENAME". In this case the FILENAME parameter would depend upon the DIRECTORY parameter. (e.g., DIRECTORY may be "/usr/local/" and FILENAME may be "/usr/local/input.dat"). Parameters may also depend upon the parameters for other components. For example, the physical location of a sink 612 may depend upon the physical location of the source 606a. In this example, the sink 612 includes a set of parameters 604g which includes a FILENAME parameter which depends upon the DIRECTORY parameter of the source 606a. (e.g., the FILENAME parameter in the set 604g may be "/usr/local/output.dat" where the value "/usr/local/" is obtained from the DIRECTORY parameter in the set 604a.)

Figure 6B:
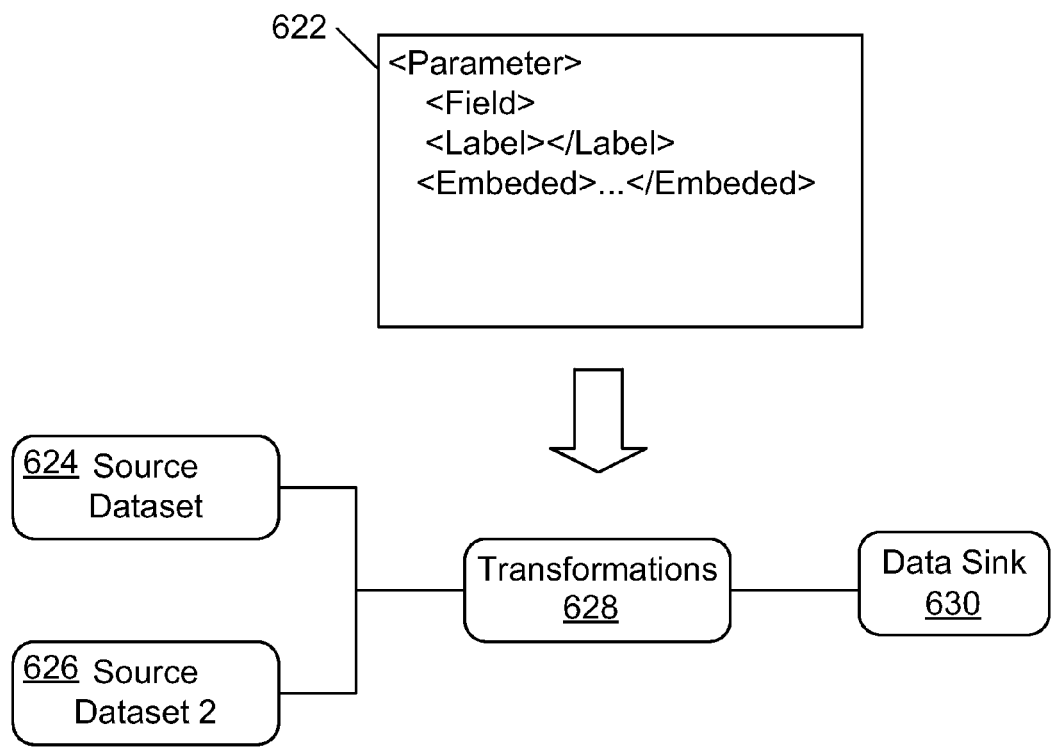
FIGS. 6B and 6C are diagrams of portions of an interface for customizing the dataflow graph.

Within the user interface on the client, the parameters of the parameter sets 604a-604g may be combined and reorganized into different groups for interacting with a user, which reflect business considerations rather than technical ones. The user interface for receiving values for the parameters based on user input can display different parameters according to relationships among the parameters in a flexible way that is not necessarily restricted by aspects of the development environment on the server. For example, referring to FIG. 6B, a user interface can be presented in which icons are displayed with relationships that represent dependencies among the parameters. In this example, the parameters are divided into a first group of parameters, represented by a first source icon 624 representing parameters for a first source dataset, a second source icon 626 representing parameters for a second source dataset, a sink icon 630 representing parameters for a sink dataset, and a transformation icon 628 that representing parameters for one or more components of the dataflow graph being configured, showing their relationship to the source datasets and the sink dataset. This grouping of parameters may be made based on a stored specification 622 which defines how a user will interact with the parameters from the dataflow graph within the user interface on the client and how the user interface elements, such as the icons 624, 626, 628, 630, will be related to each other and arranged for presentation in the user interface. In some implementations, the specification is an XML document. The specification may also identify the dataflow graph components and may identify particular components for which certain functions can be performed while the user is configuring the graph, such as viewing sample data, as described in more detail below.

Figure 6C:
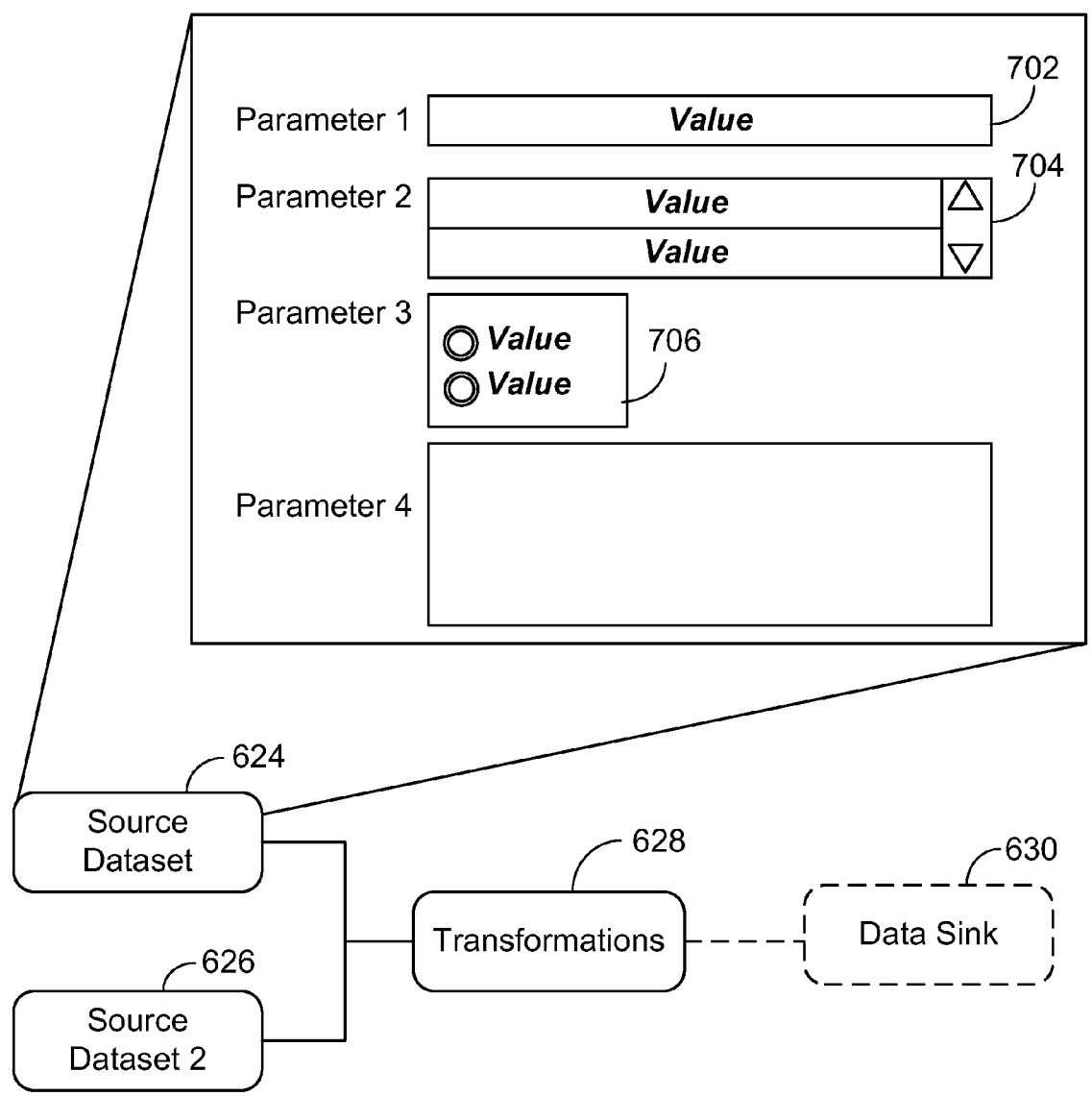

In some cases, the specification may include instructions for how parameters are to be displayed. For example, referring to FIGS. 6B and 6C, the specification 622 may indicate that, in response to interacting with the source dataset icon 624, one parameter should be displayed as a text box 702 that the user may fill in, while another parameter should be a drop down list 704 with prepopulated values (for example, a list of values provided in the specification, or values provided in a lookup table), still another parameter may be displayed as a radio button 706, etc. Thus, the specification provides flexibility in how the parameters are to be presented to the user for customizing a dataflow graph in a way that can be tailored to a business and/or non-technical user. For example, a user interface may be populated with values based on queries executed against a database (e.g., a SQL query) or from a file located on a file system. In some cases, the specification may enable the user to select a source of data for the application. For example, the specification may permit a user to select a database, a table, or a file. One or more parameters may be displayed together in groups. For example, the specification may state that parameters are to be presented together in a box on the user interface. In some implementations, the user interface may be divided into columns and rows. The specification may identify the location of the parameter or collection of parameters based on the section of the user interface where the parameters are to be displayed.

In some cases, the specification may include the ability for user to select fields which are processed by a component. Available fields may be displayed in the user interface and the user may select one or more fields for inclusion in the parameter set. The specification may enable the user to filter a dataset by selecting values for specific fields (e.g., where the State is "FL").

In some cases, the specification may constrain the order in which a business user populates the parameter values. Represented by the dotted lines, parameters associated with the sink 630 may not be visible to the user until the user meets some predefined condition. For example, the user may have to provide a particular parameter value or fill out a set of parameters before the data sink parameter set appears. Parameters may also be defined as required indicating that a value must be assigned to the parameter.

Figure 7A:
FIG. 7A represents an exemplary display of results in the interface.

In some cases, the specification may present different parameters based on the role of the user. For example, a template might hide or disable a group of text input controls and links unless the user has a "manager" role. In some implementations, the system may allow a user to run sample data through the graph by initiating execution of the graph on the server from within the user interface, as configured by the parameter values, and to display the results 702 of the sample run to the user in the user interface, as shown in FIG. 7A. The results 702 can be viewed in an appropriate browser or editor of the user interface, depending on what type of data are included in the results 702. In this example, the results 702 include rows that correspond to records within the sample data and columns that correspond to values in the records of for different fields. The execution of the graph on the server using test data can be triggered in response to any of a variety of actions at the client, for example, in response to a user supplying a value for a parameter.

Figure 7B:
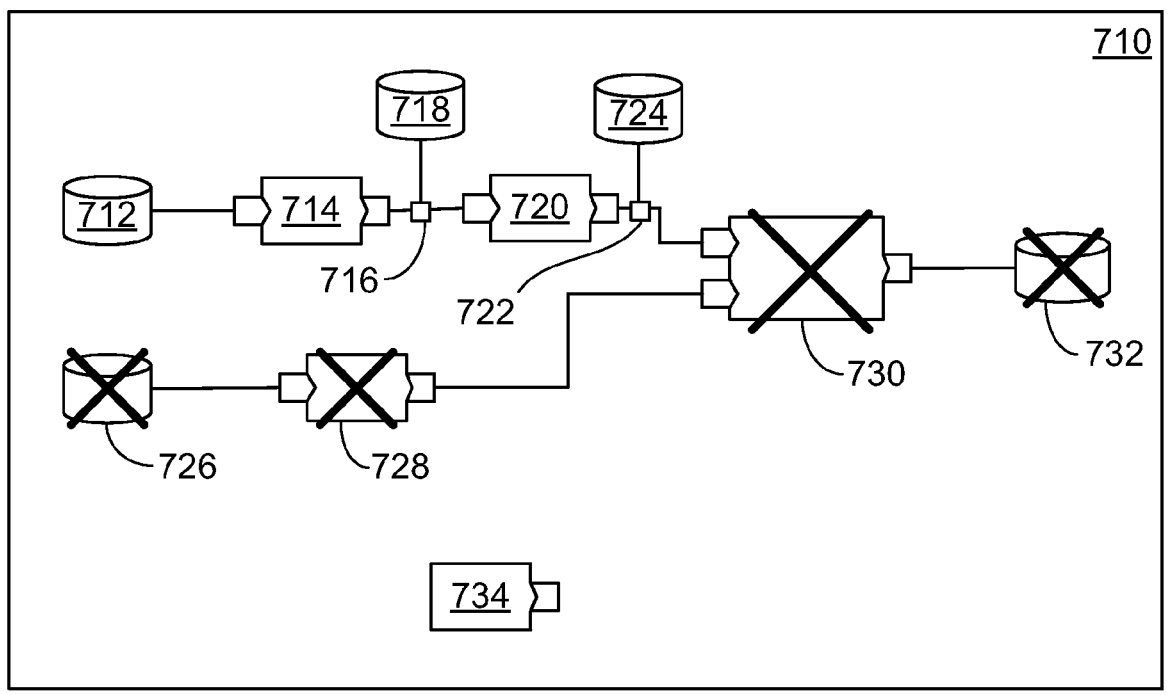
FIG. 7B is a diagram of an example dataflow graph.

Referring to FIG. 7B, in some implementations, the system can capture data flowing through the system by the addition of watchers. For example, a dataflow graph 710 includes data sources 712, 726, components 714, 720, 728, and 730, and the data sink 732. A user can add watchpoints at any link in the dataflow graph. For example the user can add watchpoint 722 to a link between component 720 and component 730. The system detects the watchpoint 722 and generates a modified version of the graph to redirect the flow of data from component 720 to an intermediate data sink 724 that stores data for the watchpoint. In some implementations, the watchpoint 722 is implemented as a replicator allowing data to flow to the intermediate data sink 724 and data component 730.

In some implementations, the system determines that the components 728, 730 and data source 726 and data sink 732 are not required to generate the data for the watchpoint 722. The system can elect to disable these unnecessary components to conserve system resources. Further, disabling unnecessary components can have the added advantage of simplifying development because the downstream components (for example, component 730) of the unused components (for example, component 728) may not have been fully implemented or configured. In disabling these components the system can execute a portion of the graph without the developer being required to fully configure the entire graph.

In some implementations, the system identifies links that are not required to produce data for the watchpoint. For example, the system can identify links that do not connect any source (for example, the data source 712) to the intermediate data sink 724. The components which provide data to these links can be removed.

In some implementations, the system can utilize data from a previous watchpoint to determine data for a subsequent watchpoint. For example, in a previous execution of the graph, the developer added watchpoint 716 to the link between component 714 and component 720. The data for the watchpoint 716 was stored in the data sink 718. If in a subsequent execution, the developer adds watchpoint 722 without changing or modifying the data source 712 or the data component 714 the system can use the data in the data sink 718 as a data source for component 720 and consequently may disable data source 712 and component 714.

The system can detect if the data flow is a normal flow or a parallel flow. Parallel flows are data flows which have been partitioned. Watchpoints on parallel flow use a separate data sink for each flow of data. For example, a parallel data flow which had been partitioned into six separate partitions would generate watch data in six separate data sinks.

Graphs can be divided into phases. Components in an earlier phase complete all execution before components in a later phase. For example, if component 730 were in a later phase than component 728, the data flow from component 728 would be cached until component 728 has completed processing on all the data. Once component 728 completed processing all the data, then component 730 would begin processing the data. In some scenarios, the dataflow graph 710 includes components, such as component 734, that are not connected to other components, for example, lookup tables. Disconnected components are excluded from the dataflow graph if the components is in a later phase than the watchpoints and included in the graph if the components are in the same or an earlier phase than the watchpoint.

Figure 8:
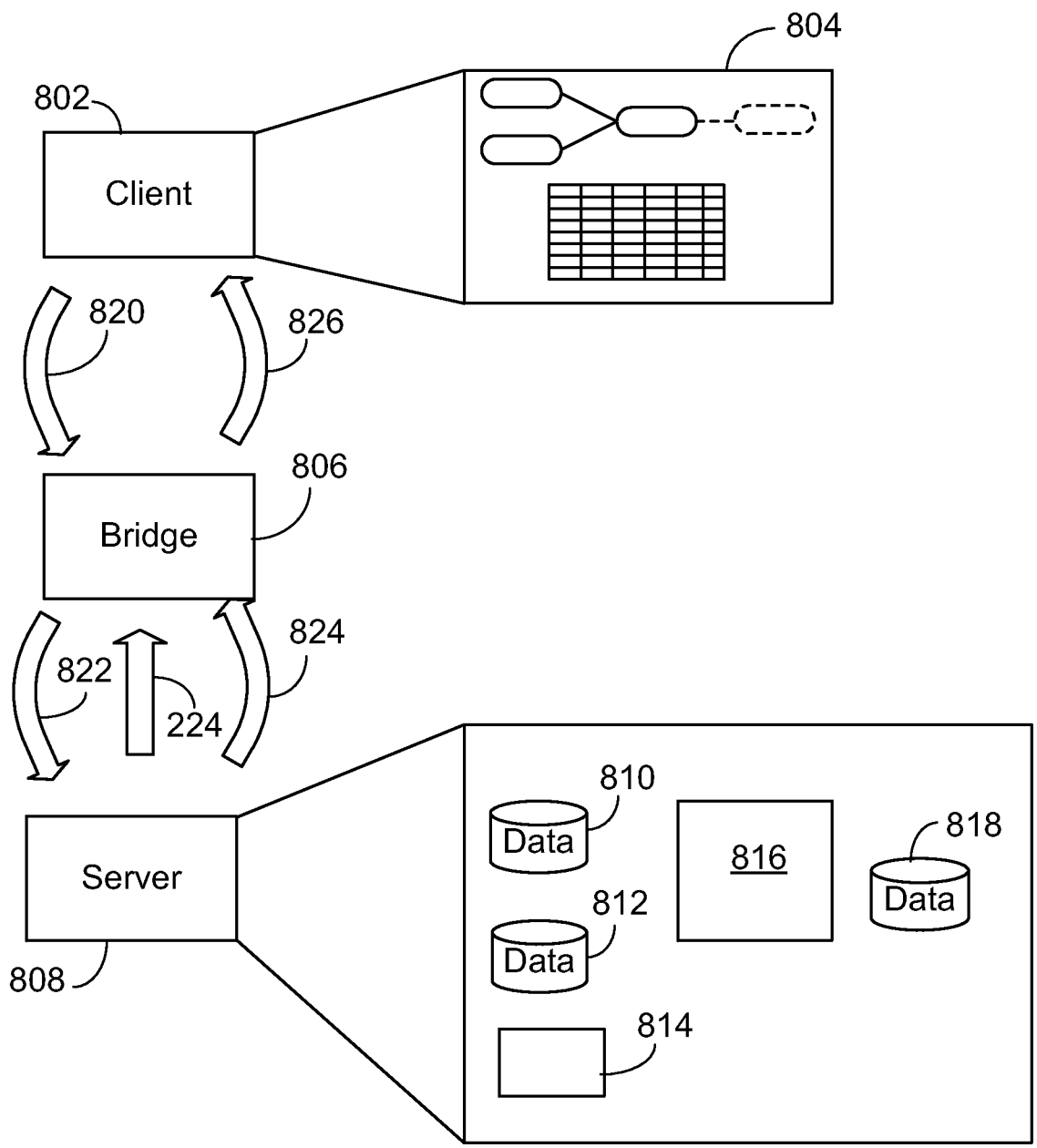
FIG. 8 is a schematic diagram of a bridged client server system.

Referring to FIG. 8, a client system 802 may be displaying the user interface 804 described above the user. The parameter set 814 generated based on interactions with the user through the user interface 804 may be stored on a server 808. Consequently, changes made by the user interface 804 are sent from the client 802 to the server 808 via a bridge 806. Represented by arrow 820, the client 802 sends a message to the bridge 806 in one format, for example a message sent using the simple object access protocol (SOAP). The bridge 806 translates the message into a new format and if necessary begins a client session with the server 808. Represented by arrow 822, the bridge 806 sends a message to the server 808 in a format understood by the server 808, for example a COM+ message. The server 808 receives the message and updates the parameter set. Represented by arrow 824, the server 808 send a reply to the bridge 806 containing any changes that occurred to the parameter set due to the input received by the client 802. The bridge 806 decodes the message and creates a reply message for the client 802. Represented by arrow 826, the bridge 806 sends the reply message to the client 802. The client 802 updates the user interface 804 to reflect the changes, including displaying any components which were previously hidden due to the failure of a precondition as described above.

The user may also indicate to the client 802 that he wishes to execute the graph being constructed using sample data based on the current set of parameters, which may or may not be complete. As above, the client 802 sends a message to the server 808 via the bridge 806. The server 808 applies any changes to the parameter set and a process 816 running on the server compiles the dataflow graph. The server executes the compiled dataflow graph, which accepts data from the sample datasets 810, 812. The executed dataflow graph produces the requested output to an output dataset 818. The output of the dataflow graph is the intermediate data requested by the client 802 and not necessarily the data which would be produced by complete execution of the dataflow graph.

In some implementations, the server 808 may compile a subset of the dataflow graph, for example, if insufficient parameters are defined to enable the compilation of the complete graph or if the client 802 requests to see the intermediate data for a particular link within the dataflow graph that is being configured by the client 802. To determine the subset of the dataflow graph to compile and execute the server may use the process described above with respect to FIG. 7B where an intermediate data sink is added for the link being configured instead of for a watchpoint.

As described above, the resulting data is sent from the server 808 to the client 802 via the bridge 806.

The object management approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method performed by a computer bridge for supporting communication between a client and a server, including
providing an interface that receives one or more parameters for defining respective characteristics of components of a dataflow graph that includes multiple nodes representing components of the dataflow graph and links between the nodes representing flows of data between the components;
receiving, by the computer bridge, a first message over a network from a client;
creating an object in response to the first message;
sending a response to the first message to the client;
receiving, over the network, changes to the object from a server;
storing the changes to the object;
receiving a second message from the client; and
sending the stored changes to the client with a response to the second message;
wherein the object corresponds to a portion of the dataflow graph;
wherein the interface displays multiple user interface elements with relationships among the user interface elements being based on dependencies between components of the dataflow graph;
wherein the relationships are defined by a specification stored on the server.

2. The method of claim 1, wherein storing the changes includes creating a log of changes and wherein sending the stored changes to the client includes sending the log of changes.

3. The method of claim 1, wherein storing the changes includes updating a current state of the object and wherein sending the stored changes to the client includes sending the current state of the object.

4. The method of claim 1, wherein receiving the first message from the client includes receiving a temporary identifier for a client object; creating the object includes obtaining a permanent identifier for the object; and sending the response to the first message includes sending a mapping between the temporary identifier and the permanent identifier.

5. A method performed by a computer bridge for supporting communication between a client and a server, including
receiving, by the computer bridge, a first message over a network from a client;
creating an object in response to the first message;
sending a response to the first message to the client;
receiving, over the network, changes to the object from a server;
storing the changes to the object;
receiving a second message from the client; and
sending the stored changes to the client with a response to the second message;
wherein the object corresponds to a portion of a dataflow graph that includes multiple nodes representing components of the dataflow graph and links between the nodes representing flows of data between the components;
wherein receiving the first message includes receiving a request for intermediate data and creating the object includes:
compiling the portion of the dataflow graph, and
producing output to an output dataset by executing the compiled portion of the dataflow graph;
wherein creating the object further includes:
determining a first set of components required to generate the intermediate data;
disabling components in the dataflow graph that are not in the first set of components; and
creating an intermediate data sink coupled to the dataflow graph to store the output dataset.

6. The method of claim 5, wherein determining the first set of components includes identifying links that do not connect a data source to the intermediate data sink.

7. The method of claim 5, wherein creating an intermediate data sink includes determining that a link to the intermediate data sink represents a parallel data flow; and
creating a parallel data sink as the intermediate data sink.

8. A non-transitory computer-readable medium storing a computer program for supporting communication between a client and a server, the computer program including instructions for causing a computer to:
provide an interface that receives one or more parameters for defining respective characteristics of components of a dataflow graph that includes multiple nodes representing components of the dataflow graph and links between the nodes representing flows of data between the components;
receive, over a network, a first message from a client;
create an object in response to the first message;
send a response to the first message to the client;
receive, over the network, changes to the object from a server;
store the changes to the object;
receive a second message from the client; and
send the stored changes to the client with a response to the second message;
wherein the object corresponds to a portion of the dataflow graph;
wherein the interface displays multiple user interface elements with relationships among the user interface elements being based on dependencies between components of the dataflow graph;
wherein the relationships are defined by a specification stored on the server.

9. The medium of claim 8, wherein storing the changes includes creating a log of changes and wherein sending the stored changes to the client includes sending the log of changes.

10. The medium of claim 8, wherein storing the changes includes updating a current state of the object and wherein sending the stored changes to the client includes sending the current state of the object.

11. The medium of claim 8, wherein receiving the first message from the client includes receiving a temporary identifier for a client object; creating the object includes obtaining a permanent identifier for the object; and sending the response to the first message includes sending a mapping between the temporary identifier and the permanent identifier.

12. A system for supporting communication between a client and a server, the system including:
- a server including at least one processor; and
- a bridge including at least one processor configured to manage objects in the system, where the managing includes:
  - providing an interface that receives one or more parameters for defining respective characteristics of components of a dataflow graph that includes multiple nodes representing components of the dataflow graph and links between the nodes representing flows of data between the components;
  - receiving, over a network, a first message from a client,
  - creating an object in response to the first message,
  - sending a response to the first message to the client,
  - receiving, over the network, changes to the object from the server,
  - storing the changes to the object,
  - receiving a second message from the client, and
  - sending the stored changes to the client with a response to the second message;
- wherein the object corresponds to a portion of the dataflow graph;
- wherein the interface displays multiple user interface elements with relationships among the user interface elements being based on dependencies between components of the dataflow graph;
- wherein the relationships are defined by a specification stored on the server.

13. The system of claim 12, wherein receiving the first message from the client includes receiving a temporary identifier for a client object; creating the object includes obtaining a permanent identifier for the object; and sending the response to the first message includes sending a mapping between the temporary identifier and the permanent identifier.

14. A system for supporting communication between a client and a server, the system including:
- at least one processor;
- means for serving data; and
- means for managing objects in the system, wherein the managing includes
  - providing an interface that receives one or more parameters for defining respective characteristics of components of a dataflow graph that includes multiple nodes representing components of the dataflow graph and links between the nodes representing flows of data between the components;
  - receiving, over a network, a first message from a client,
  - creating an object in response to the first message,
  - sending a response to the first message to the client,
  - receiving, over a network, changes to the object from the means for serving data,
  - storing the changes to the object,
  - receiving a second message from the client, and
  - sending the stored changes to the client with a response to the second message;
- wherein the object corresponds to a portion of the dataflow graph;
- wherein the interface displays multiple user interface elements with relationships among the user interface elements being based on dependencies between components of the dataflow graph;
- wherein the relationships are defined by a specification stored on the server.

15. A non-transitory computer-readable medium storing a computer program for supporting communication between a client and a server, the computer program including instructions for causing a computer to:
- receive, by the computer bridge, a first message over a network from a client;
- create an object in response to the first message;
- send a response to the first message to the client;
- receive, over the network, changes to the object from a server;
- store the changes to the object;
- receive a second message from the client; and
- send the stored changes to the client with a response to the second message;
- wherein the object corresponds to a portion of a dataflow graph that includes multiple nodes representing components of the dataflow graph and links between the nodes representing flows of data between the components;
- wherein receiving the first message includes receiving a request for intermediate data; and creating the object includes:
  - compiling the portion of the dataflow graph, and
  - producing output to an output dataset by executing the compiled portion of the dataflow graph;
- wherein creating the object further includes:
  - determining a first set of components required to generate the intermediate data;
  - disabling components in the dataflow graph that are not in the first set of components; and
  - creating an intermediate data sink coupled to the dataflow graph to store the output dataset.

16. The medium of claim 15, wherein determining the first set of components includes identifying links that do not connect a data source to the intermediate data sink.

17. The medium of claim 15, wherein creating an intermediate data sink includes determining that a link to the intermediate data sink represents a parallel data flow; and creating a parallel data sink as the intermediate data sink.

18. A system including:
- a server including at least one processor; and
- a bridge including at least one processor configured to manage objects in the system, where the managing includes
  - receiving, by the computer bridge, a first message over a network from a client;
  - creating an object in response to the first message;
  - sending a response to the first message to the client;
  - receiving, over the network, changes to the object from a server;
  - storing the changes to the object;
  - receiving a second message from the client; and
  - sending the stored changes to the client with a response to the second message;
- wherein the object corresponds to a portion of a dataflow graph that includes multiple nodes representing components of the dataflow graph and links between the nodes representing flows of data between the components;
- wherein receiving the first message includes receiving a request for intermediate data; and creating the object includes:

compiling the portion of the dataflow graph, and
producing output to an output dataset by executing the compiled portion of the dataflow graph;
wherein creating the object further includes:
determining a first set of components required to generate the intermediate data;
disabling components in the dataflow graph that are not in the first set of components; and
creating an intermediate data sink coupled to the dataflow graph to store the output dataset.

19. The system of claim 18, wherein determining the first set of components includes identifying links that do not connect a data source to the intermediate data sink.

20. A system for supporting communication between a client and a server, the system including:
at least one processor;
means for serving data; and
means for managing objects in the system, wherein the managing includes:
receiving, by the computer bridge, a first message over a network from a client;
creating an object in response to the first message;
sending a response to the first message to the client;
receiving, over the network, changes to the object from a server;
storing the changes to the object;
receiving a second message from the client; and
sending the stored changes to the client with a response to the second message;
wherein the object corresponds to a portion of a dataflow graph that includes multiple nodes representing components of the dataflow graph and links between the nodes representing flows of data between the components;
wherein receiving the first message includes receiving a request for intermediate data; and creating the object includes:
compiling the portion of the dataflow graph, and
producing output to an output dataset by executing the compiled portion of the dataflow graph;
wherein creating the object further includes:
determining a first set of components required to generate the intermediate data;
disabling components in the dataflow graph that are not in the first set of components; and
creating an intermediate data sink coupled to the dataflow graph to store the output dataset.

* * * * *

UNITED STATES PATENT AND TRADEMARK OFFICE
CERTIFICATE OF CORRECTION

| | | |
|---|---|---|
| PATENT NO. | : 8,661,154 B2 | Page 1 of 1 |
| APPLICATION NO. | : 12/967533 | |
| DATED | : February 25, 2014 | |
| INVENTOR(S) | : Jennifer M. Farver et al. | |

It is certified that error appears in the above-identified patent and that said Letters Patent is hereby corrected as shown below:

Title page, column 1 (Related U.S. Application Data), line 1, delete "61/268,293" and insert -- 61/286,293 --

In the Claims:

Column 14, line 14, in claim 5, delete "data and" and insert -- data; and --

Signed and Sealed this
Twenty-seventh Day of May, 2014

Michelle K. Lee
*Deputy Director of the United States Patent and Trademark Office*